United States Patent [19]

Brundisini

[11] Patent Number: 4,937,732
[45] Date of Patent: Jun. 26, 1990

[54] IRRIGATION CONTROLLER

[75] Inventor: Andrea Brundisini, Dana Point, Calif.

[73] Assignee: James Hardie Irrigation, Inc., Laguna Niguel, Calif.

[21] Appl. No.: 110,665

[22] Filed: Oct. 20, 1987

[51] Int. Cl.⁵ .................. G06F 15/46; G05D 7/06
[52] U.S. Cl. ............................ 364/145; 239/69; 364/420; 364/510; 137/624.2
[58] Field of Search ............. 364/145, 146, 181, 510, 364/420, 200, 900, 143, 144, 138, 139, 191–193; 370/87; 340/825.01; 239/66–72; 137/624.11, 624.18, 624.2, 624.21, 624.27, 551, 486–487.5

[56] References Cited

U.S. PATENT DOCUMENTS

| | | | |
|---|---|---|---|
| 3,951,339 | 4/1976 | Dufresne | 239/70 X |
| 4,019,175 | 4/1977 | Nakao et al. | 364/900 |
| 4,091,446 | 5/1978 | Demonte et al. | 364/200 |
| 4,176,395 | 11/1979 | Evelyn-Veere et al. | 239/69 |
| 4,189,776 | 2/1979 | Kendall | 364/510 |
| 4,244,022 | 1/1981 | Kendall | 364/510 |
| 4,539,655 | 9/1985 | Trussell et al. | 340/825.01 |
| 4,548,225 | 10/1985 | Busalacchi | 239/70 |
| 4,569,020 | 2/1986 | Snoddy et al. | 239/69 |
| 4,573,115 | 2/1986 | Halgrimson | 364/138 |
| 4,722,478 | 2/1988 | Fletcher et al. | 364/144 X |

FOREIGN PATENT DOCUMENTS 8605945 10/1986 World Int. Prop. O.

OTHER PUBLICATIONS

Richdel Turf Irrigation Division 1987 *Product Catalog*; Rev. 1-1/87.

Rain Bird Turf Irrigation Equipment 1986, front page, back page, and miscellaneous unnumbered pages.
1987 Irrigation Products, Toro, front page, back page, and pp. 1–12.
1987 Landscape and Turf Catalog, L.R. Nelson Corporation, cover page, back page and pp. 20–25.
Turf Irrigation Catalog, James Hardie Irrigation, cover page, back page, and pp. 2, 37–39; Mar., 1987.
Irri-Trol Irrigation Controllers and Sepcification Catalog 1987, cover page, back page, and pp. 3–11, 17, and 25.

Primary Examiner—Joseph Ruggiero
Attorney, Agent, or Firm—Gordon L. Peterson; Loyal M. Hanson

[57] ABSTRACT

An irrigation controller includes a microprocessor for controlling a plurality of watering stations under program control according to a plurality of parameter values, and a module dimensioned and arranged to enable a user to transport the module by hand. A memory is provide in the module for storing a set of the parameter values, and first and second mating connectors are provided on respective ones of a housing for the microprocessor and the module. The connectors are operationally connected to respective ones of the microprocessor and the memory circuit to enable the user to couple the memory means to the microprocessor in order to transfer the remotely programmed set of the parameter values to and from the microprocessor means. Microprocessor programming enables automatic watering interval adjustment, open circuit testing, and individual watering station shutdown in the event of a fault condition.

19 Claims, 10 Drawing Sheets

IRRIGATION CONTROLLER

CROSS REFERENCE TO RELATED APPLICATION

This application is related to the copending and commonly assigned United States patent application entitled "Irrigation Controller With Display" having the same filing date and naming the same inventor as this application.

BACKGROUND OF THE INVENTION

1. Technical Field

The invention relates generally to irrigation equipment, and more particularly to a programmable controller for multiple watering stations.

2. Background Information

Irrigation controllers provide centralized control of watering stations located at remote sites over the field to be irrigated. The controller may include electrical circuitry housed within a stand-alone unit suited for installation at a conveniently accessible outdoor location in or adjacent the field, and it is wired to each of the watering stations where it functions to activate the stations according to a desired watering schedule For large irrigation projects, more than one controller may be utilized, each controlling a share of the watering stations to enable more effective and convenient irrigation, as well as better water conservation.

Some existing controllers accomplish the above under microprocessor control. Once preprogrammed with the start time, duration, and repetition rate desired for each station, the microprocessor produces control signals that are used to activate solenoid valves at the watering stations. This causes water to flow at each station on schedule. The microprocessor does this accurately and dependably, while allowing the user great flexibility in prescribing the exact watering schedule desired.

However, effective irrigation must account for other factors. For example, considerations such as long term weather changes or field condition may dictate changes in the prescribed watering schedule. When this happens, personnel skilled in programming the controller may have to visit each controller location to enter a new watering schedule. Once at the controller location, various pushbuttons and knobs may have to be manipulated to enter the new schedule, and this procedure may be not only inconvenient and time consuming, but also susceptible to error.

Consequently, it is desirable to have a new and improved irrigation controller that alleviates this concern—one that can be more conveniently programmed without the need for skilled personnel to visit and operate each controller.

In addition, short term weather conditions, such as a rainy day, may leave the field in a damp condition so that the scheduled watering is unnecessary. Some existing controllers accept a soil sensor input to account for this condition, and when the sensor indicates that the soil has reached a predetermined level of dampness, the controller is disabled from performing its scheduled watering that day. However, this technique does not permit a partial watering after a light rain. In other words, the soil may be only slightly damp so that a partial watering is still needed. Consequently, it is desirable to have a controller that compensates for varying degrees of soil dampness as well.

Furthermore, watering station malfunctions may occur in the normal course of operations, such as a short circuit or open circuit condition in the lines connecting the controller to the solenoids, or in the solenoids themselves. These may have severe consequences. A short circuit condition, for example, may damage the controller and thereby affect all the watering stations. To overcome this concern, short circuit protection is provided in some existing controllers that results in the controller deactivating the malfunctioning watering station altogether when a short circuit condition occurs.

However, both short circuit and open circuit conditions have other important affects—they alter the watering schedule of the malfunctioning station. An open circuit, for example, may result in a particular watering station remaining inactive so that a portion of the field being irrigated goes without water for an unknown period of time until the malfunction is visually observed. This threatens harm to the field, and so it is desirable to have a controller designed to better manage this problem also.

Other malfunctions may occur. For example, the valve at a particular watering station may fail to open, even though the solenoid is activated properly. When this occurs, increased water pressure may result in damage to various components of the irrigation system. Thus, it is desirable to have a controller designed to overcome this problem as well.

SUMMARY OF THE INVENTION

This invention recognizes the problems associated with the prior art and provides a new and improved irrigation controller with the desired attributes.

Briefly, the above and further objects of the present invention are realized by providing a microprocessor-based controller that includes a portable memory module for remote programming purposes, together with provisions for automatic adjustment of watering intervals, open circuit testing, and individual station shutdown in case of malfunctioning. It can compensate for varying degrees of soil dampness. It can test for open circuit conditions, and it permits individual station shutdown for fault conditions, such as a high pressure condition.

Generally, an irrigation controller constructed according to the invention includes a microprocessor for controlling a plurality of watering stations under program control according to a plurality of parameter values. According to a major aspect of the invention, there is provided a module dimensioned and arranged to enable a user to transport the module by hand. A memory is provide in the module for storing a set of the parameter values, and first and second mating connectors are operationally connected to respective ones of the microprocessor and the module memory circuit to enable the user to couple the module memory circuit to the microprocessor in order to transfer the set of the parameter values between the module memory and the microprocessor.

According to another aspect of the invention there is provided an input connector for coupling a first input signal to the microprocessor while a first one of the watering stations is activated to indicate when the first watering station has been activated for a desired length of time. The microprocessor is programmed for adjusting the period of time that each one of the watering stations is activated according to the ratio of the desired length of time to the assigned period of time for the first watering station. This works well with a soil sensor, for example, that produces a switch closure when soil dampness reaches a desired level. The switch closure produces the first input signal, and the microprocessor adjusts watering activity accordingly.

According to yet another aspect of the invention, there is provided an open circuit testing arrangement for determining whether there exists an open circuit condition associated with one of the watering stations. This may include programming that operates in conjunction with a current sensing circuit to determine whether an open circuit condition exists. A fault indicator may be displayed and an alarm output signal generated if it does exist.

Still another aspects of the invention includes a second input connector for coupling a second input signal to the microprocessor means for purposes of indicating that a watering station should be disabled. This may be produced by the switch closure of a high pressure indicating sensor, for example, and the microprocessor is programmed to disable a selected watering station that is activated when the second input signal occurs. A fault indicator may be display and an alarm output signal generated, also.

The above mentioned and other objects and features of this invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 1:
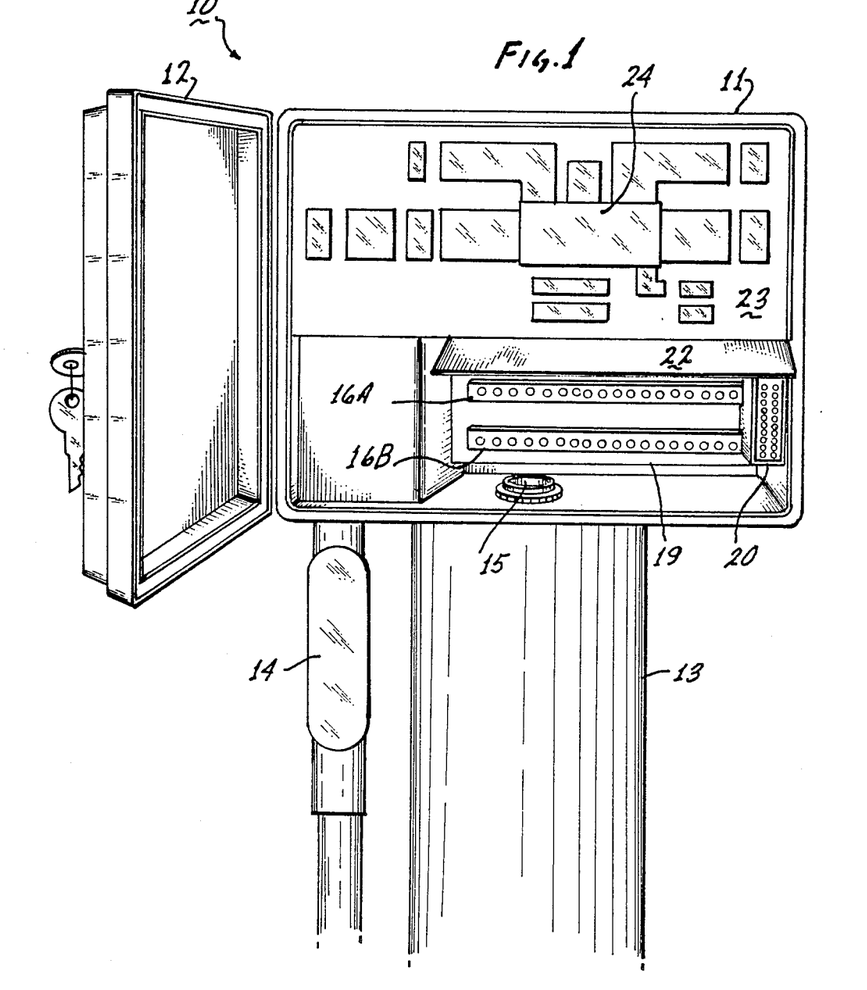
FIG. 1 of the drawings is a perspective view of an irrigation controller constructed according to the invention.

Referring now to FIG. 1 of the drawings, there is shown an irrigation controller 10 constructed according to the invention. Generally, the controller 10 includes a box 11 with a lockable lid 12 that seals the interior from the elements and unauthorized access, and it is mounted on a suitable support structure, such as a wall or a pedestal 13 that may be located adjacent a field to be irrigated.

Wires from a separate electrical power source (not shown) are routed through a conduit 14 to the controller 10, and wires from solenoid valves at each of the watering stations in the the field (not shown) are routed through an entrance 15 to connectors 16A and 16B mounted on a connector panel 19 within the interior of the box 11. These couple control signals from the controller 10 to the solenoid valves in order to actuate them.

The connectors 16A and 16B are also utilized to couple input signals to the controller 10, such as those from a soil sensor, for example, or other auxiliary input devices. In addition, a memory module connector 20 is provided on the connector panel 19, and this is used in conjunction with a memory module 21 (subsequently described with reference to FIG. 2) to enable a user to transfer remotely programmed parameter values to and from the controller 10. A connector panel cover 22 operates to cover this portion of the controller 10.

The controller 10 also includes a control panel 23 on which is mounted a uniquely configured display module 24. The display module 24 operates in conjunction with various control panel switches and labeling indicia (subsequently described with reference to FIGS. 5 and 6) to greatly facilitate controller operation.

Figure 2:
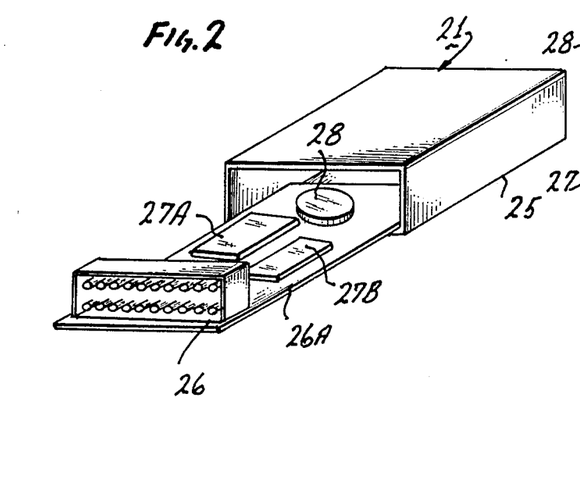
FIG. 2 is an enlarged perspective view of a memory module shown partially disassembled that is used for transferring remotely programmed parameter values to and from the controller.

Generally, the memory module 21 includes a housing 25 that is dimensioned and arranged to enable a user to transport the module by hand (FIG. 2). In other words, it can be held in the hand, and as an idea of size, the illustrated housing 25 is in the form of a box approximately nine centimeters long and thirteen centimeters in girth. A connector 26 is mounted on a circuit board 26A that mounts conventionally within the housing 25, and this connector mates with the connector 20 on the connector panel 19 (FIG. 1).

In this regard, the connector 26 and circuit board 26A are shown in FIG. 2 in a partially disassembled position for illustrative convenience. It may take the form of a twenty-pin connector, and once the connector 26 and the circuit board 26A are secured within the housing 25, the memory module 21 can be plugged into the memory module connector 20 on controller 10 in order to transfer parameter values from the module 21 to the controller.

The module 21 includes an electronic memory circuitry 27 (FIG. 3) for storing a remotely programmed set of the parameter values. This circuitry may include a commercially available memory module 27A, such as a 8K×8-bit static RAM, low-power, CMOS memory, and a latch 27B, such as a commercially available eight-bit latch (FIG. 2). These are interconnected with the connector 26, utilizing known components and design techniques, to store digital data representing the parameter values.

Figure 3:
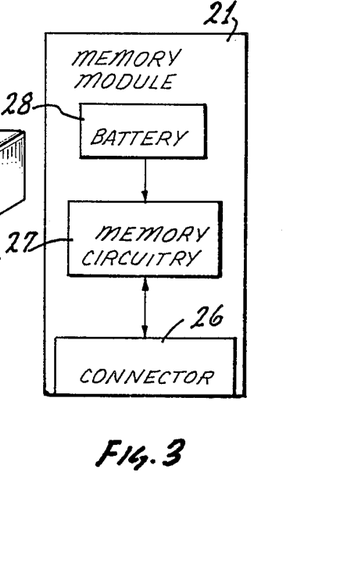
FIG. 3 is a schematic block diagram of the memory module circuitry.

The memory circuitry 27 is powered by a battery 28, and it is coupled to the connector 26 (FIG. 3). The user preprograms the module 21 by plugging it into a programming device designed for this purposes. This might be another controller similar to the controller 10 that is maintained at the office for programming purposes. Once preprogrammed, the module 21 is transported to the controller 10 where it is plugged into the connector 20 to transfer the preprogrammed parameter values to the controller 10. Transfer may be accomplished automatically under program control by sensing for the presence of the module 21, or it may be operator-initiated by various means, such as the depression of one or more switches on the control panel 23. The information on the controller can also be stored on the memory module to be analyzed in the office or transferred to a computer system for more sophisticated analysis or programming.

Figure 4:
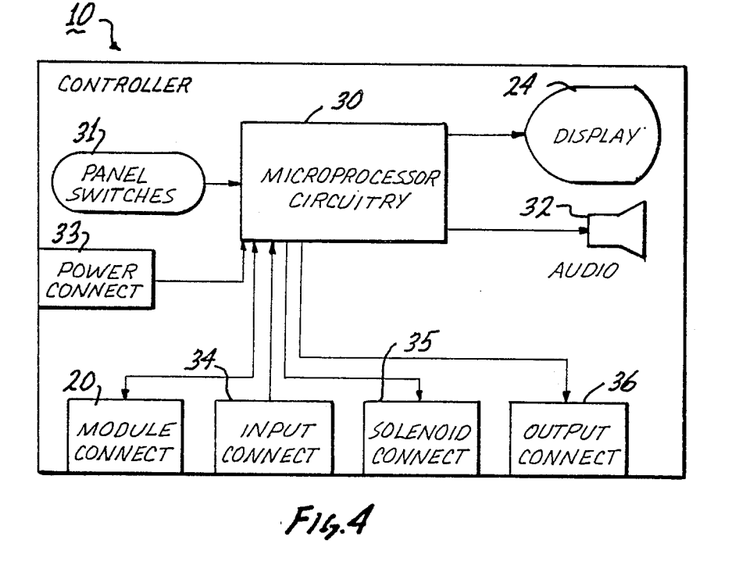
FIG. 4 is a schematic block diagram of the controller circuitry.

As shown in schematic block diagram form in FIG. 4, the circuitry employed in the controller 10 includes microprocessor circuitry 30. This may include one or more microprocessor chips, memory, power supply components, a battery backup connector, and related supporting circuitry that use suitable known components, design techniques, and programming to accomplish the functions described. So configured, it serves as microprocessor means for controlling a plurality of watering stations under program control according to a plurality of stored parameter values.

The display module 24 mentioned previously with reference to FIG. 1, and a series of panel switches 31 (FIG. 4) are operationally connected to the microprocessor circuitry 30 to enable the display and change of the parameter values by actuating appropriate ones of the panel switches 31. These are subsequently described in further detail with reference to FIG. 6 where they are individually designated by other reference numerals. In addition, an audio output device 32 is operationally connected to the microprocessor circuitry 30 for providing an audible output signal, and a power connector 33 is included for coupling the separate electrical power source to the microprocessor circuitry 30.

An input connector 34 couples input signals, such as a soil sensor signal or other autobudget signal to be subsequently described, a remote start signal, a remote stop signal, and a high or low pressure sensor signal, and an output connector 36 couples output signals, such as a main water valve control signal or alarm output signal. These connectors may be terminals on the connectors 16A and 16B mentioned with reference to FIG. 1, as may be the solenoid connector 35 shown in FIG. 4 which couples control signals (twenty-four volts, for example) from the microprocessor circuitry to the solenoid valves.

Figure 5:
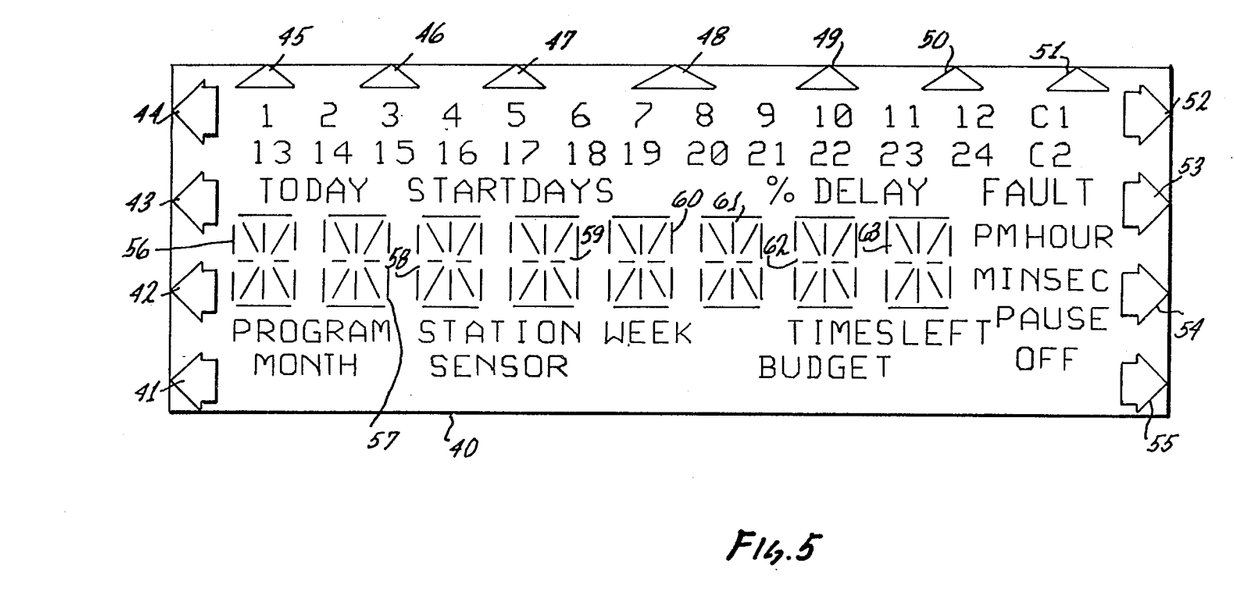
FIG. 5 is an enlarged view of the fixed pattern of display elements provided on the display module.

Although the display module 24 and panel arrangement are described in detail in the copending application mentioned above, which application is incorporated by reference for the details provided, it is worthwhile to review some of its features for added insight. The display module 24 utilizes a known type of display, such as the liquid crystal type, that is conventionally fabricated with a fixed pattern of display elements. This pattern is illustrated in FIG. 5 where there is shown a transparent panel 40 on which is disposed a plurality of display elements of various shapes. These include those forming the numerals one through twenty-four, the symbols "C1" and "C2", the various illustrated words, such as TODAY, PROGRAM, WEEK, etc., a percent sign, fifteen arrowheads 41–55, and a plurality of line segments arranged in eight, fourteen-segment alphanumeric display configurations 56–63.

Each of the display elements is fabricated according to known techniques to include a thin, electrically-conductive member in the shape of a desired image. These are conventionally supported in spaced apart relation to conductive back panels, with a liquid crystal composition in between. Individual ones of the display elements are energized or activated by impressing a potential across it and a corresponding one of the back planes. This is conventionally done with fine, electrically-conductive traces connected to the various conductive members and back planes, the conductive traces being coupled in turn to the microprocessor circuitry so that each display element can be activated separately under microprocessor control.

Thus, the display module 24 includes a first plurality of display elements configured to produce images of a selected group of parameter values. These are the display elements making up the alphanumeric display configurations 56–63. In addition, the display module 24 includes a second plurality of display elements configured to produce images for identifying the selected group. These are the arrowheads 41–55. They are disposed along a marginal edge portion 24A of the display module 24, and they are arrowhead shaped in the sense that they are triangularly-shaped with an apex oriented to point outwardly from the display module. Of course, other shapes may be used within the broader concept of this inventive aspect. Together, the elements 41-63 display both the parameter values and the group identifying information desired, thereby overcoming the previously mentioned problems of some existing controllers.

In addition, the display module 24 includes a third plurality of display elements configured to produce a plurality of labeling images to be used in displaying additional information related to the selected group of parameter values. These are the fixed numerals, words, and symbols. Each of the numerals one through twenty-four may be activated, for example, to indicate that the display parameter values relate to a watering station represented by that numeral.

Those of the third plurality of display elements forming the various words and symbols may be energized to identify the parameter values being displayed. Depending on which group is selected, for example, the alphanumeric configurations 56 and 57 may be used to display parameter values representing a date, a particular program symbol, or a designation of the watering schedule. Thus, the appropriate one of the words "TODAY," "PROGRAM," and "MONTH" are activated to indicated which of these parameter values are being displayed. In addition, the controller 10 may be configured to recognize various "fault" conditions, such as a short circuit, and activate the word "FAULT" when such a condition occurs.

Figure 6:
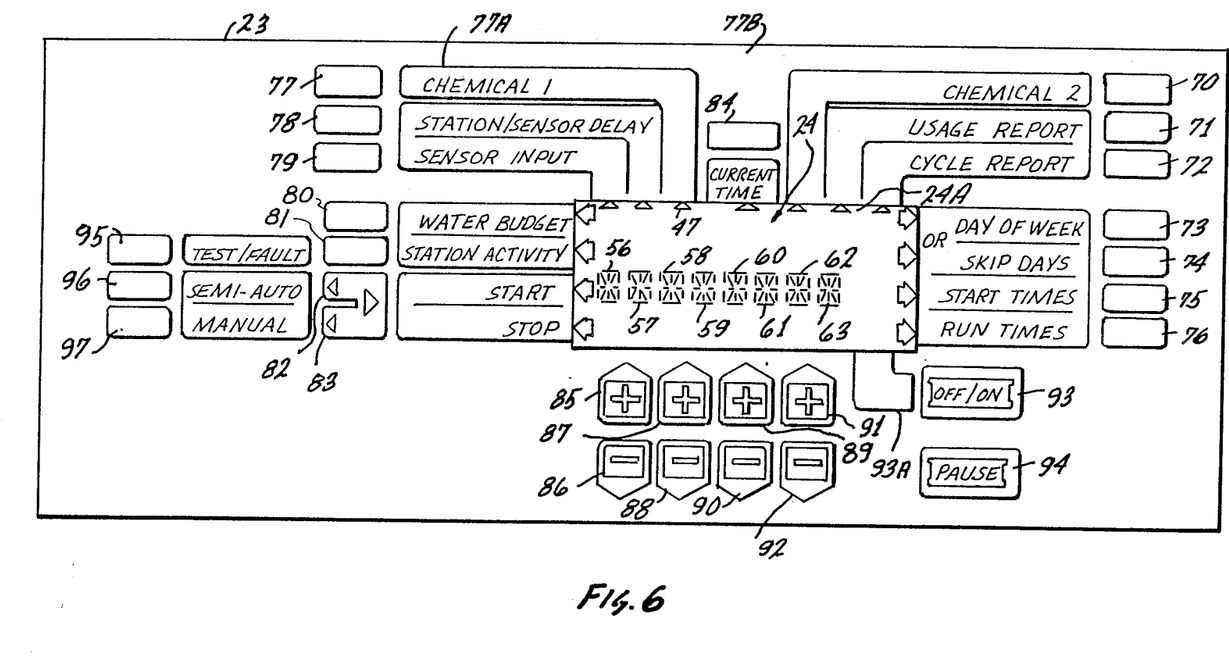
FIG. 6 is an enlarged view of the control panel layout, including the display module, switches, and labeling indicia.

The display module 24 is mounted on the panel 23, along with various labeling indicia and a complement of panel switches 70–97 (FIG. 6). The panel switches are of the conventional membrane type which are actuated when depressed, and this facilitates operation by a user having large, muscular hands and fingers that may be covered with soil and water. The user merely "points at" the appropriately labeled switch to actuate it (touches it with an extended finger), instead of manipulating a knob or multiple switches closely spaced in a keypad configuration. This also serves to minimize the transfer of soil and water from the user's hands and fingers to the control panel 23. In addition, the spaced-apart arrangement of the switches provides space for larger and more detailed labeling than possible with a keypad arrangement.

A first plurality of the panel switches, selector switches 70–81 and 84, serve as selector means for initiating the display of a selected one of a plurality of predefined groups of the parameter values. These switches are operationally connected to the microprocessor circuitry, and each one corresponds to a respective one of the groups of the parameter values, the respective group being indicated by a corresponding selector switch labeling indicia on the panel 23.

Selector switches 82 and 83 are also operationally connected to the microprocessor, but in the illustrated controller 10 they are used to start and stop certain controller operations. Otherwise, they are generally similar to the other selector switches. In this regard, the controller causes arrowheads 41 and 42 to flash on and off as a cue for the operator to depress one of the switches 82 and 83, although other operational schemes may be provided within the broader inventive concepts disclosed.

Each of the selector switch labeling indicia is similar in several respects, and only the one designated "CHEMICAL 1" is described in further it detail. The one designated "CHEMICAL 1" includes an indicator strip 77A on which the symbol "CHEMICAL 1" appears. It may be suitably affixed to the panel 23, such as by being painted on the panel or being part of a decal that is affixed to the panel 23, and it extends intermediate the selector switch 77 and the marginal edge portion 24A of the display module 24, adjacent to the arrowhead 47.

The illustrated strip 77A is approximately seven millimeters wide, and it is a color that contrasts with the panel background 77B, white on black, for example. Thus, it provides a visually discernible indication of the relationship between the arrowhead 47 and the selector switch 77. When the arrowhead 47 is activated, this means that the selector switch 77 has been actuated and the group of parameter values corresponding to selector switch 77 are being displayed.

In a similar manner, there is provided the illustrated selector switch labeling indicia for each of the selector switches 70-84. Each one of these indicia extends as illustrated in FIG. 6 intermediate a respective one of the selector switches 70-84 and a corresponding one of the arrowheads 41-55. In this regard, only the reference numeral for arrowhead 47 is included in FIG. 6, because the display module 24 is reduced in size significantly compared to the enlarged view in FIG. 5. Also, most of the third plurality of display elements are not illustrated in FIG. 6 for the same reason.

A second plurality of the panel switches, incrementing/decrementing switches 85-92, serve as parameter-changing means for enabling the user to change the value of selected ones of the selected group of parameter values as the group is displayed. These switches are operationally connected to the microprocessor circuitry, and they are arranged in pairs that includes an incrementing switch (labeled with a "+") and a decrementing switch (labeled with a "−").

A pair of these switches, switches 85 and 86, change the values displayed on alphanumeric configurations 56 and 57. Similarly, a pair of switches 87 and 88 changes the values displayed on the alphanumeric configurations 58 and 59, a pair of switches 89 and 90 changes the values displayed on the alphanumeric configurations 60 and 61, and a pair of switches 91 and 92 changes the values displayed on the alphanumeric configurations 62 and 63.

The panel switches 70-97 also include a series of control switches 93-97. Switch 93 turns the output to the solenoids off until pressed again, or for a programmable number of days up to thirty-one days, while switch 94 initiates a pause in controller operations that disables power to the output while the controller otherwise runs normally. Certain ones of the third plurality of display elements produce images in the form of the words "PAUSE" and "OFF" to indicate that switches 93 and 94 have been actuated, and a labeling indicia 93A relates the switch 93 to the display of the word "OFF". Switches 95-97 initiate other controller functions, and they are provided with adjacent labeling indicia also, disposed near the selector switches 82 and 83 because their operation relates to those selector switches.

Focusing now on the novel combination of functions performed by the controller 10, these include a "watering interval adjustment" feature that is described with reference to the flow chart illustrated in FIG. 7, an "open circuit testing" feature described with reference to the flow chart illustrated by the combination of FIGS. 8a and 8b, and an "auxiliary control input" feature described with reference to FIG. 9. In addition, there is provided a "memory transfer" feature that is described with reference to the flow chart illustrated by the combination of FIGS. 10a and 10b.

Each of these features is accomplished by programming of the microprocessor circuitry 30. In other words, the microprocessor circuitry 30 serves as means for controlling a plurality of watering stations under program control according to a plurality of parameter values, and the programming serves as means for performing the various functions of the features to be described. This programming is done utilizing known programming techniques for the particular microprocessor circuitry 30 employed to accomplish the novel combinations of functions described. Thus, the programming for each of the features to be described may be in the form of a subroutine that is executed under control of a main program, subroutine execution being initiated upon the occurrence of a particular event.

For example, in each of the illustrated flow charts, controller startup is indicated at 100. This occurs when power to the controller 10 is turned on, and it is followed by an initialization sequence at 101 to set default values for various parameter values and otherwise conventionally ready the main program for execution. Then, control passes to the main program at 102 until the occurrence of the particular event that results in execution of one of the illustrated subroutines. This sequence is common to each of the illustrated flow charts, and reference numerals 100-102 are utilized in each to designate these aspects.

The various groups of parameter values, or parameter value programs, that are stored in memory designate various modes of controller operation. The various parameter values for each may be entered by the user from the control panel 23 (FIG. 6). For example, the connector 34 of the controller 10 (FIG. 4) includes a pair of terminals to which a signal may be coupled for purposes of starting controller operation according to a selected one of the parameter value programs. This signal may be produced by a switch closure, for example, and closing the switch starts the program for which this feature has been selected.

This start input feature is selected for a program of parameter values by first depressing switch 79 on the control panel 23 (FIG. 6). When this is done, a program designation is displayed by alphanumeric display element 56, and this is changed to the desired program of parameter values by operation of switches 85 and 86. The letter "A" may be displayed to designate a program A of parameter values, for example.

Also, an input feature designation is displayed by alphanumeric display elements 58–60, and this is changed to the desired designation for the desired input feature, namely "STR" for the start input feature The other input designations that may be selected for the controller 10 are "STP" for a stop input feature, "AB" for an automatic budgeting or watering interval adjustment feature, and "AUX" for an auxiliary input feature. A separate pair of input terminals is provided on the connector 34 for each of these, also.

Next, switches 91 and 92 are operated to until the word "ON" is displayed by alphanumeric display elements 62 and 63. Doing this selects the start input feature for program A. The switches 91 and 92 may also be operated to display the symbol "OF" for the word "off" with alphanumeric display elements 61–63, and this de-selects the displayed input feature for the displayed parameter values program. Other input features may be selected by operation of the control panel switches in a similar manner, or parameter values may be preprogrammed in the memory module 21 for transfer to the controller 10 in a manner subsequently described.

Figure 7:
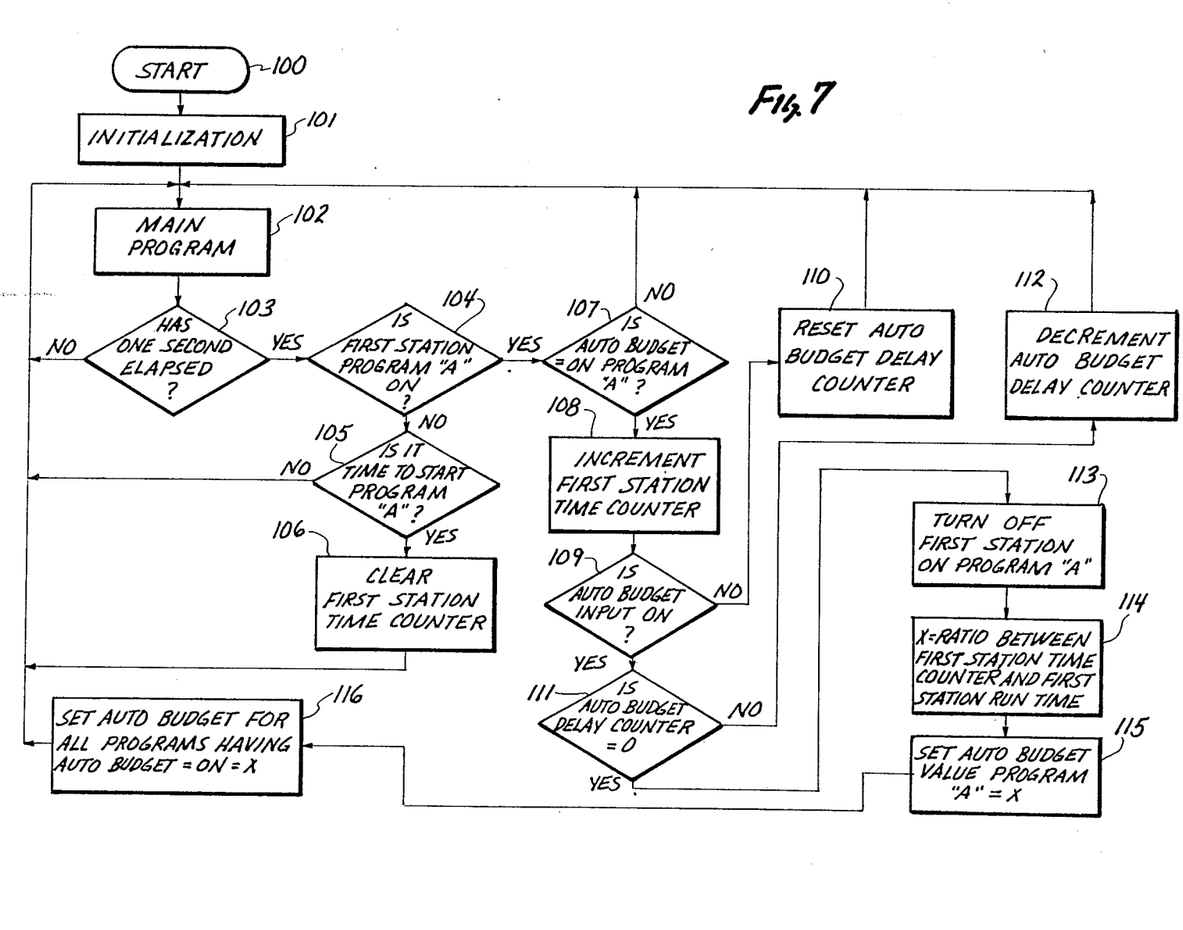
FIG. 7 is a flow chart of the autobudget feature of the invention; /

Considering now the watering interval adjustment feature and the watering interval adjustment subroutine flow chart illustrated in FIG. 7, it shows the execution of programming that serves as means for adjusting the period of time that each one of the watering stations is activated according to the ratio of the desired length of time to the assigned period of time for the first watering station. Program execution periodically exits from the main program at 102 to determine at 103 if one second has elapsed since the last execution of the watering interval adjustment subroutine. This is done by checking a time counter in memory that functions as a clock. If one second has not elapsed, program execution returns to the main program at 102. Of course, this time interval may be varied to some value other than one second.

If one second has elapsed, program execution determines at 104 whether the first watering station in a plurality of watering stations being controlled by the controller 10 is on. This is done by checking certain parameter values in memory associated with the first watering station to determine whether that watering station is supposed to be currently activated, i.e. whether a solenoid valve activating signal is supposed to be coupled to the solenoid valve of the watering station to cause it to operate. The parameter values may indicate, for example, a day and time that the watering station is to be activated or turned on, and this set of parameter values is referred to in the flow chart as program "A."

If the first station is not on, program execution determines at 105 whether it is time to activate the first watering station. This is determined from the program "A" parameter values in memory, also. If it is not time to activate the first watering station, program execution returns to the main program. If it is time to activate the first watering station, program execution proceeds by clearing the first station time counter at 106, i.e., setting it to zero, and then returning to the main program. This time counter is a clock in memory that indicates how long the watering station has been activated.

If the first station is determined to be on at 104, program execution proceeds to determine at 107 whether the watering interval adjustment feature is on for the program "A" parameter values. If it is not, execution returns to the main program. If the watering interval adjustment feature is on, execution proceeds at 108 to increment the first station time counter, and then determine at 109 whether the watering interval adjustment input is on.

At this point, it is worthwhile to review front panel operation for turning the watering interval adjustment feature on. This is done by first depressing switch 79 (FIG. 6), which results in the words PROGRAM and SENSOR on the display module 24 being activated (FIG. 7). Also, a parameter value group designation or program designation is displayed with the alphanumeric display elements 56 and 57, while a sensor input designation is displayed with element 59 and the word ON or the symbol "OF" for the word "off" is displayed with elements 61–63. The user operates switches 85 and 86 to select a desired program, switches 87 and 88 to select a desired one of four sensor inputs, and switches 91 and 92 to select whether the watering interval adjustment feature is on or off for the selected program.

The selected sensor input (or watering interval adjustment input) is coupled to the input connector 34, and from there to the microprocessor circuitry 30. It may be produced, for example, by the closure of a switch associated with a soil sensor located in soil watered by the first watering station or by an independent, stand alone weather station that analyzes conditions such as wind, temperature, and humidity. When the soil dampness reaches a certain level, the switch closes. Of course, it may be produced by other means, such as an operator controlled switch located in the office that is activated to vary the watering interval according climatic conditions or other criteria.

Whatever the source of the watering interval adjustment input, program execution determines at 109 whether it is on. If it is not, program execution proceeds at 110 by resetting a delay counter or clock in memory and then returning to the main program. If this input is on, however, program execution proceeds at 111 by first determining whether the delay counter has timed out, i.e., decreased to zero. This delay overcomes problems associated with switch bounce and other such transients that may be coupled to the input connector 34.

If the delay counter has not timed out, program execution proceeds at 112 by decrementing the delay counter and returning to the main program. If the delay counter has timed out, however, program execution proceeds at 113 to turn off the first watering station to which the program "A" parameter values apply. This is done at any time over a watering interval that is one and one-half times the watering interval indicated by the program "A" parameter values for the first watering station. Of course, the subroutine may be programmed to increase this interval even further.

Thus, the watering interval adjustment feature enables the watering interval designated by a selected program of parameter values to be extended or foreshortened according to the occurrence of the watering interval adjustment input. Once the first watering station to which the selected program of parameter values applies has been turned off, the watering intervals for the other watering stations to which those parameter values apply are also automatically adjusted by the same ratio.

As shown in FIG. 7, program execution proceeds from 113 by determining at 114 an approximation of the ratio of the time interval for which the first watering station was on to the time interval indicated by the program "A" parameter values. This approximation is used at 115 to set a watering interval value associated with each of the other watering stations to which the program "A" parameter values apply. This watering interval value is used to extend or foreshorten the watering intervals of the other watering stations by the same approximation.

In addition, program execution proceeds at 116 to set the watering interval value associated with the program "A" parameter values to all other programs of parameter values for which the watering interval adjustment feature is on. Thus, the watering intervals for all watering stations are automatically adjusted for all parameter value programs for which watering interval adjustment has been selected according to the ratio established by the watering interval adjustment input for the first watering station to which the first parameter value program (program "A") applies.

Figure 8A:
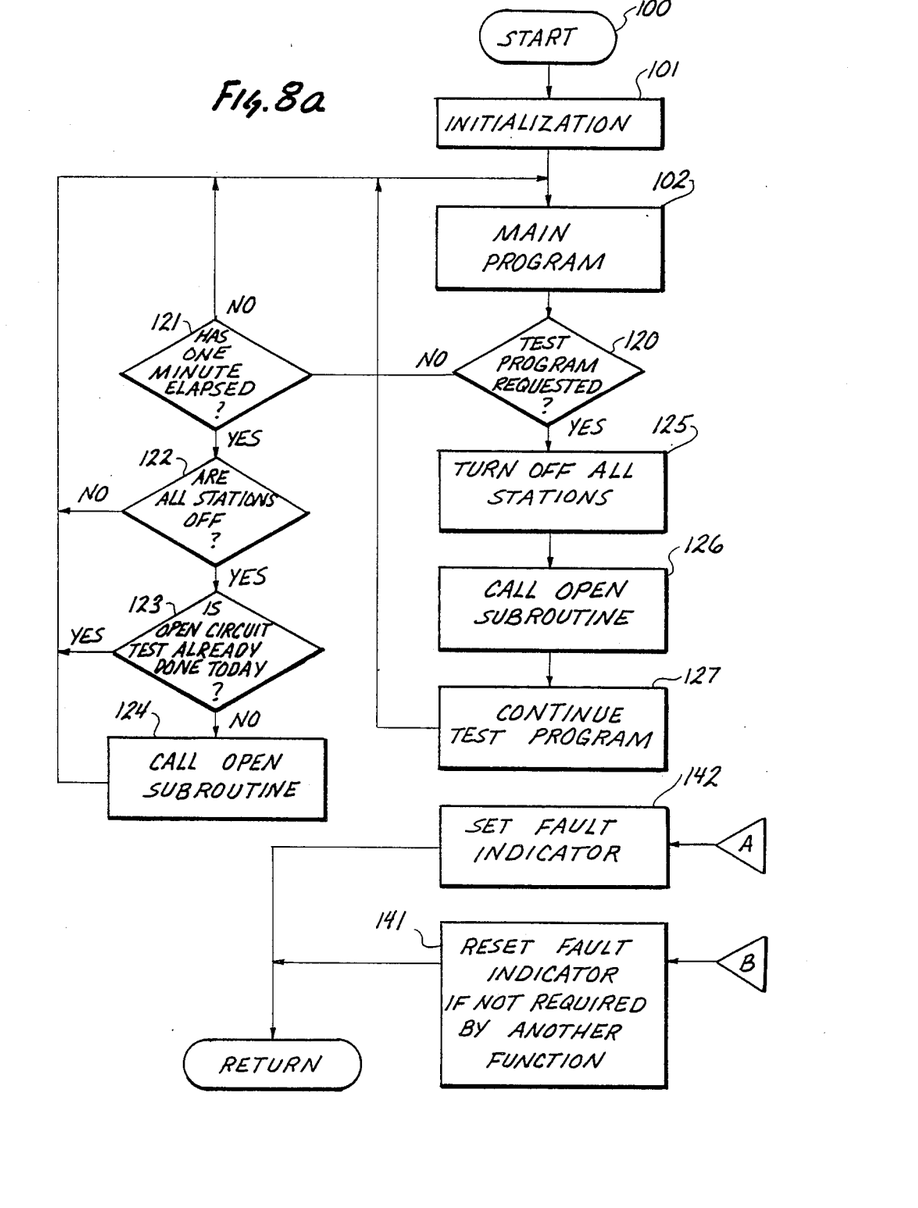
FIGS. 8a and 8b combine to form a flow chart of the open circuit testing feature.
Figure 8B:
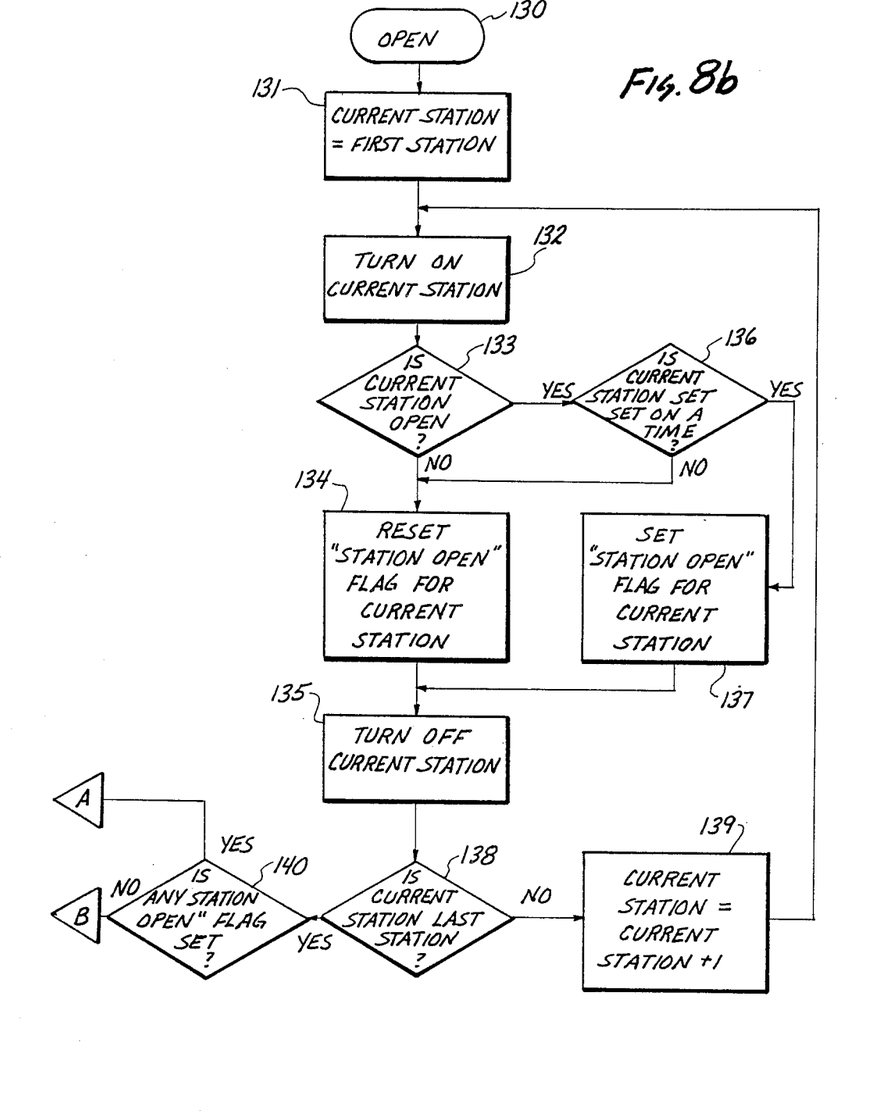

Considering now the open circuit testing feature, FIGS. 8a and 8b combine at the connections A and B to form one flow chart descriptive of this feature. It shows execution or programming that serves as open circuit testing means for determining whether there exists an open circuit condition associated with one of the watering stations.

After startup at 100 and initialization at 101, program execution proceeds to the main program at 102. From there, program execution periodically proceeds to determine at 120 whether open circuit testing has been requested by the user depressing switch 95 on the control panel 23 (FIG. 6). If it has not, program execution proceeds to determine at 121 whether one minute has elapsed since the last time an open circuit test was conducted. If not, program execution returns to the main program at 102.

If one minute has elapsed, however, program execution proceeds to determine at 122 whether all of the watering stations are off, and if they are not all off, program execution returns to the main program. Thus, the program waits until watering stations are off before conducting an open circuit test.

If all the watering stations are off, program execution proceeds to determine at 123 whether an open circuit test has already been conducted the current day. If it has, program execution returns to the main program. If it has not, program execution proceeds at 124 to call the open subroutine that begins in FIG. 8b, and after execution of the open subroutine, execution proceeds at 124 to return to the main program at 102. Thus, an open circuit test is conducted automatically once each day, at a time when all of the watering stations are off.

If a test is requested by the operator, by the depression of the switch 95 on the control panel 23 (FIG. 6), program execution proceeds from 121 to turn all the stations off at 125, and then at 126 to call the open subroutine. Once the open subroutine has executed, program execution proceeds at 127 to return to the main program at 102. The open subroutine commences in FIG. 8b at 130 and proceeds at 131 to assign a current watering station identifier to the first watering station. Then, program execution proceeds at 132 to turn the current station on, and at 133 to determine whether an open circuit condition exists. This is accomplished by comparing the voltage drop across a resistor that is in series with the solenoid valve control signal for the current watering station with a reference voltage, and this is done utilizing known circuitry and components to produce a signal indicative of an open circuit condition for that watering station. This signal is coupled to the microprocessor circuitry 30 where it is used in making the determination at 133.

If an open circuit condition does not exist for the current station, program execution proceeds at 134 to reset a station open flag associated with the current station, and then to turn off the current station at 135. If the current station is open, however, program execution first proceeds to determine at 136 whether the station is supposed to turn on. It may not be connected, for example, so that an open condition is to be expected. This determination is made examining related parameter values in memory.

If the station is not supposed to turn on, program execution proceeds to 134. If it is supposed to turn on, however, program execution proceeds to set a station open flag for the current station at 137, and then to turn off the current station at 135.

Next, program execution proceeds to determine at 138 whether the current station is the last station. If it is not, program execution proceeds to increment the current station identifier at 139 and then return to return to 132 to test the next station, which is now the current station. If the current station is the last station, however, program execution proceeds to determine at 140 whether any station open flag has been set. If none has, program execution proceeds to reset the fault indicator at 141 (FIG. 8a) if it is not otherwise required, such as by the auxiliary control input feature or the opening circuit testing feature, and then to return to the main program. This fault indicator is the word FAULT on the display module 24 (FIG. 5). If any station open flag has been set, however, program execution proceeds to set the fault indicator at 142 (FIG. 8a), and the alarm output signal, and then to return to the main program.

Thus, this novel open circuit testing feature checks the solenoid valves automatically at predetermined times, such as once a day, and it checks when requested by the user depressing a control panel switch. In addition, it activates a fault indicator on the display module to alert the user to the open condition, and it may log periods of malfunctioning for inclusion in a report of station activity.

Figure 9:
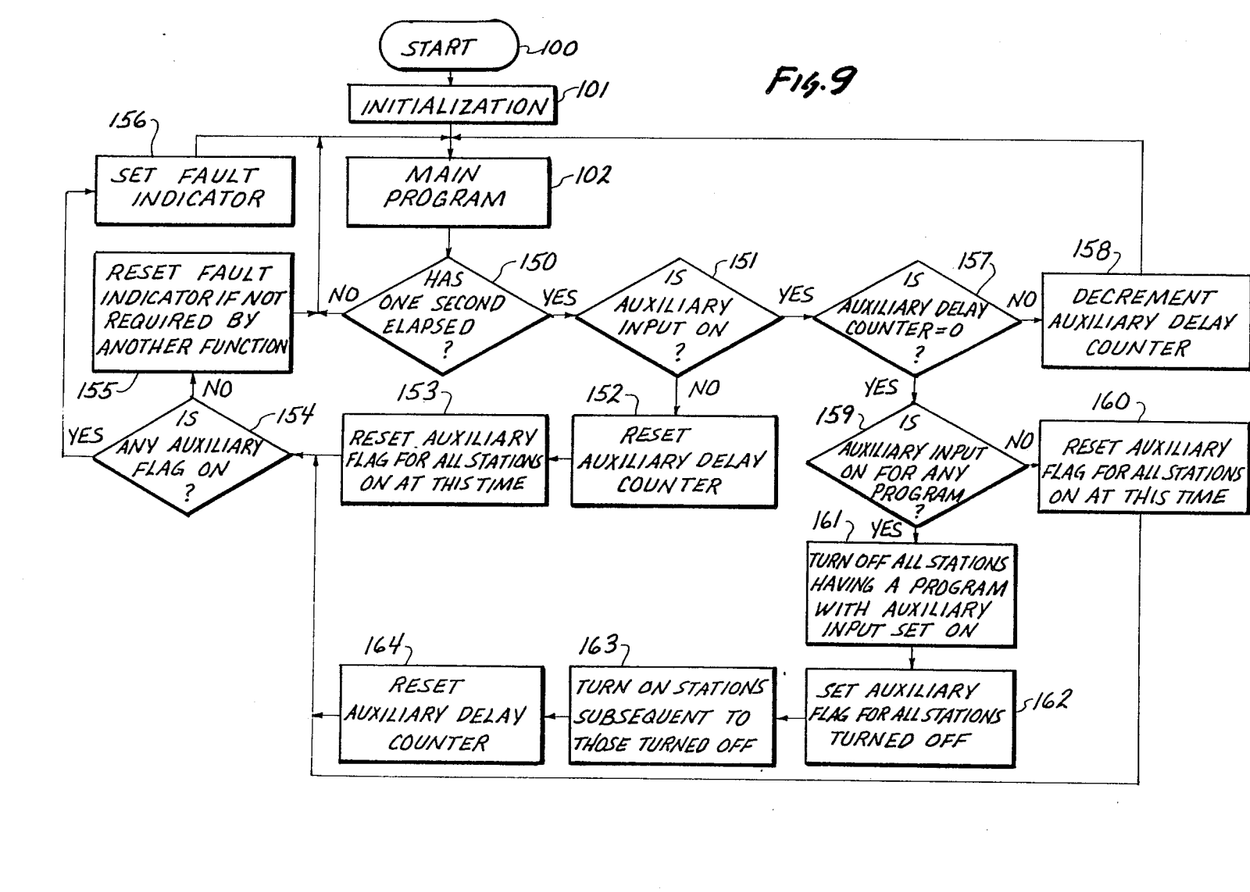
FIG. 9 is a flow chart of the auxiliary control input feature.

Considering now the auxiliary input feature, FIG. 9 illustrates a descriptive flow chart. It shows execution of programming that serves as means responsive to the occurrence of an auxiliary or second control input signal for disabling a selected watering station that is activated when the second input signal occurs. This feature operates in conjunction with an auxiliary control input that indicates a condition for which it is desirable to shut down a particular watering station. Such a condition may exist, for example, when there is a high or low pressure condition that occurs when the solenoid valve for a particular watering station is activated. This may be a condition that indicates a malfunction of some type so that shutting down the one or more affected watering stations without shutting down the rest is desirable.

The procedure by which the auxiliary feature is selected for the illustrated controller 10 begins with the depression of the switch 79 on the control panel 23 (FIG. 6). This causes an alphanumeric display, and switches 85 and 86 are operated to select the desired program for which the auxiliary feature is to apply. Then, switches 87 and 88 are operated until the letters AUX are displayed, and switches 91 and 92 are operated until the desired one of "ON" or "OF" is displayed to indicate that the auxiliary feature is on or off.

During controller operation, and after startup at 100 and initialization at 101, program execution proceeds to the main program at 102. From there, program execution periodically proceeds to determine at 150 whether one second has elapsed since the last execution of the auxiliary input subroutine. If it has not, program execution returns to the main program, but if it has program proceeds to determine at 151 whether an auxiliary input is on.

The auxiliary control input may be in the form of a signal produced by a switch closure, such as a high or low pressure switch indicating a high or low pressure condition on a main valve through which water is supplied to the watering stations. It is coupled to the input connector 34, and from there to the microprocessor circuitry 30 where it is converted to digital form for use in the auxiliary input subroutine.

If the auxiliary input is not on, program execution proceeds from 151 to reset an auxiliary delay counter at 152 that overcomes problems such as switch bounce transients. Then, program execution proceeds at 153 to reset an auxiliary flag for all watering stations that are on at that particular time, and at 154 to determine whether any auxiliary flag is on. If no auxiliary flag is on, program execution proceeds at 155 to reset the fault indicator, if it is not otherwise required, such as by the open circuit testing feature discussed previously. Then, program execution returns to the main program at 102.

If an auxiliary flag is on, however, program execution proceeds from 154 to set the fault indicator at 156 and return to the main program at 102. Thus, if the auxiliary input is not on at 151, the delay counter is reset, the auxiliary flag for all stations on at that particular time are reset, and execution is returned to the main program.

If the auxiliary input is on, however, program execution proceeds from 151 to determine at 157 whether the auxiliary delay counter has timed out. If it has not, program execution proceeds at 158 to decrement the delay counter and return to the main program. This is repeated until the delay counter times out, and then program execution proceeds to determine at 159 whether the auxiliary feature has been selected for any program of parameter values that applies to any stations that are on.

If the auxiliary feature has not been so selected, program execution proceeds at 160 to reset the auxiliary flag for all stations that are on at that time and return to the main program via the test at 154. If the auxiliary feature has been selected, however, program execution proceeds at 161 to disable all currently activated watering stations having a program of parameter values for which the auxiliary input feature has been selected. This overrides the activation of these watering stations that might otherwise normally occur on schedule.

Then, program execution proceeds at 162 to set the auxiliary flags for all stations that were disabled. These mean that each station for which it is set is associated with a program of parameter values for which the auxiliary input feature has been selected, and that the auxiliary control input came on when the station was on. Program execution then proceeds at 163 to enable all stations subsequent to those that were disabled, at 164 to reset the auxiliary delay counter, and thereafter to return to the main program via the test at 154.

Thus, the auxiliary input subroutine provides the ability to shutdown one or more malfunctioning stations while the others are kept on line. This is done in response to an auxiliary control input signal that indicates the occurrence of an undesirable condition, such as high or low pressure.

Figure 10A:
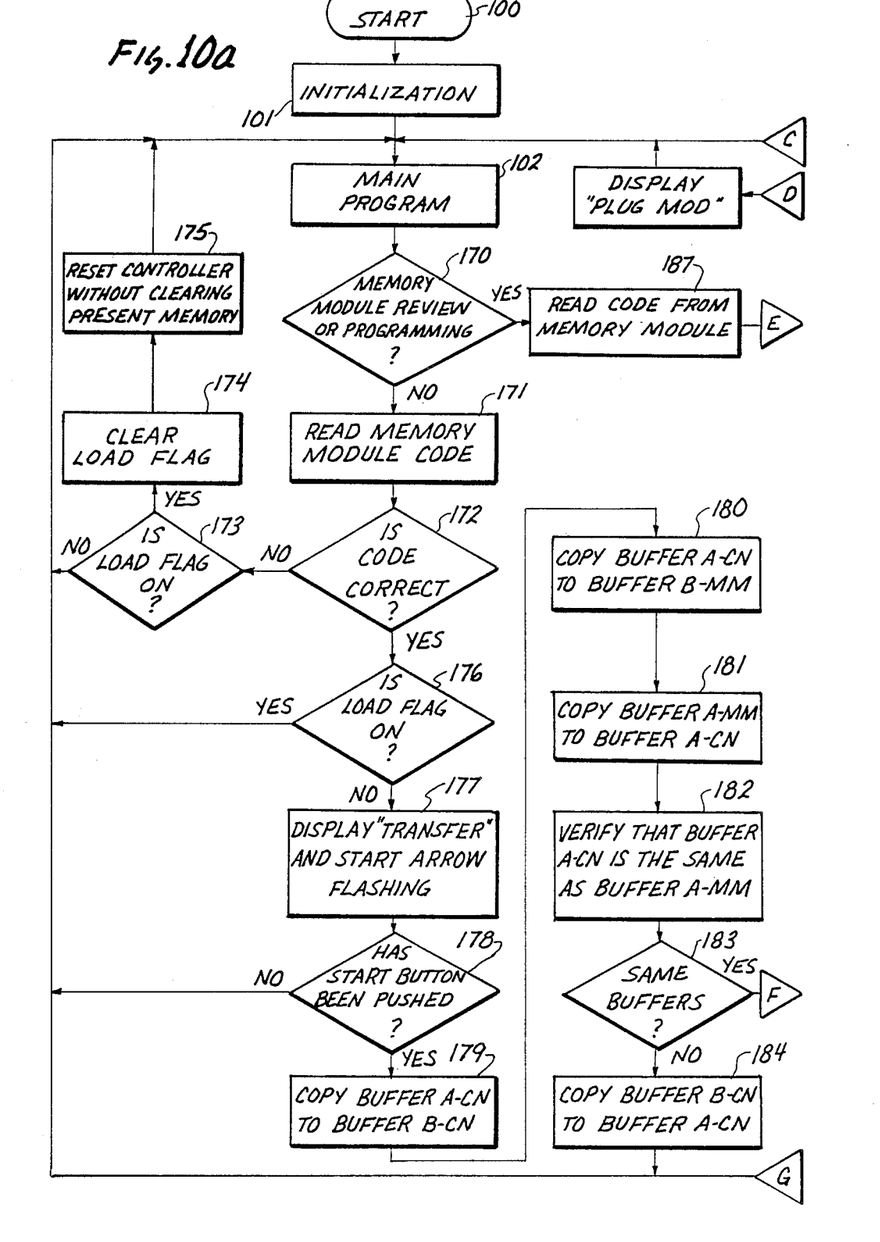
FIGS. 10a and 10b combine to form a flow chart of the memory transfer feature.
Figure 10B:
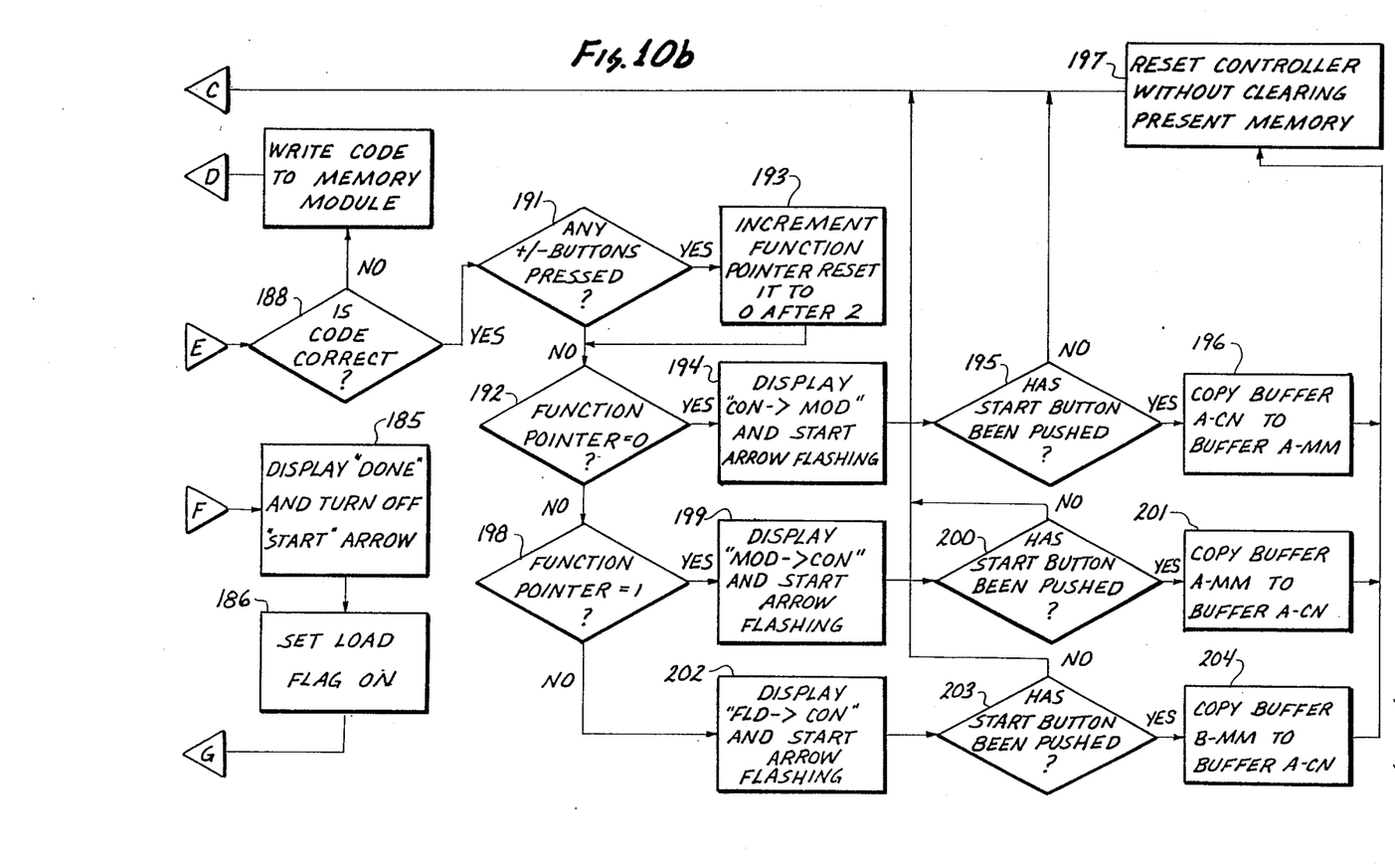

Considering now Figs. 10a and 10b, these combine at the connections C-G to form a flow chart descriptive of the memory transfer feature. It shows execution of programming that serves for transferring the set of parameter values between the microprocessor means and the module memory means. In other words, this feature enables transfer of parameter values between the memory module 21 and the controller 10.

Program execution periodically exits the main program at 102 to determine at 170 whether to program the module 21 or whether to transfer parameter values from the module 21 to the controller 10. This is accomplished by determining the status of specific ones of the switches on the control panel 23. For example, the memory transfer subroutine may check to see if all of the incrementing switches 86, 88, 90 and 92 (FIG. 6) are actuated as an indication that the user desires to program the module 21 as opposed to transferring parameter values from the module 21 to the controller 10.

If all the incrementing switches are not actuated, program execution proceeds at 171 to read the memory module code which includes a code word. It is read into a memory location internal to the microprocessor. The memory internal to the microprocessor may be divided into two buffers which may be designated buffer "A-CN" and buffer "B-CN." The buffer A-CN contains the data used by controller for normal operation, and the buffer B-CN provides temporary storage for transfer purposes.

Once the code word has been read, program execution proceeds at 172 to determine whether the code word that was read is correct by comparing it with a correct code word stored in the controller 10 memory. If the code word is not correct, and this occurs when the module 21 is not plugged into the connector 20 (FIG. 1), program execution proceeds at 173 to determine whether a load flag associated with the memory transfer subroutine is on in the controller 10 memory. This load flag is set elsewhere in the memory transfer subroutine after the transfer of data to the buffer A-CN. If the load flag is not on, program execution returns to the main program. If it is on, program execution proceeds at 174 to clear the load flag and at 175 to reset the controller for normal operation without changing the buffer A-CN.

If the code word is correct, program execution proceeds from 172 to determine at 176 whether the load flag is on. If it is, program execution returns to the main program. Thus, once data has been transferred correctly to the buffer A-CN and the load flag set, program execution continually returns to the main program until the module 21 is removed from the connector 20. When it is removed, the code word that the controller 10 reads is incorrect so that the load flag is cleared at 174 to ready the controller for another memory transfer when desired.

If the load flag is not on when checked at 176, program execution proceeds at 177 to cause the display of the word "TRANSFER" with the alphanumeric display elements 56-63 (FIG. 6) and the flashing of the arrowhead 42 (FIG. 5). Then, program execution proceeds at 178 to determine if the the start button or switch 82 (FIG. 6) is actuated. If it is not actuated, program execution returns to the main program.

If switch 82 is actuated, indicating that the user desires to transfer memory from the module 21 to the controller 10, program execution proceeds at 179-182 to transfer the data. This is done by copying the contents of the buffer A-CN (the old data) to the buffer B-CN as a backup and to a buffer B-MM in the module 21, copying the contents of a buffer A-MM in the module 21 (which contains the new data) to the buffer A-CN, and then verifying that the contents of the buffer A-CN is the same as the contents of the buffer A-MM.

Program execution then proceeds at 183 to determine if the contents of the buffers A-CN and A-MM are the same. If they are not, program execution proceeds at 184 to copy the contents of the buffer B-CN back to the buffer A-CN, and return to the main program. If they are the same, program execution proceeds at 185 (FIG. 10b) to cause the display of the word "DONE" and stop the flashing of the arrowhead 42. Then, the load flag is set at 186, and program execution returned to the main program.

Thus, the transfer of memory is conveniently done by even a user having little programming skill. The user simply plugs the preprogrammed module 21 into the connector 20 on the controller 10, and depresses the start button or switch 82 when prompted to do so by the display of the word "TRANSFER" and the flashing arrowhead 42. The user is notified when the transfer is complete by the display of the word "DONE" so that the module 21 can then be removed.

In programming the module 21, that is, selectively transferring data between it and the controller, it is plugged into the connector 20 and all of the incrementing switches are depressed. This results in program execution proceeding from 170 to read the code word at 187 (FIG. 10a) and determine if it is correct at 188 (FIG. 10b). If the code word is not correct, program execution proceeds at 189 to write the correct code to the module 21, and then at 190 to cause the display of the words "PLUG MOD" so that if the module 21 has not yet been plugged in, the user can do so.

Once it is determined at 188 that the code word is correct, program execution proceeds at 191 to determine if any of the incrementing/decrementing switches 85-92 (FIG. 6) are actuated. If one is not, program execution proceeds to determine at 192 whether a function pointer in memory that is associated with the memory transfer subroutine is equal to zero. If one of the switches 85-92 is actuated, the function pointer is first incremented at 193 (or reset to zero when it reaches three).

If the function pointer is equal to zero at 192, program execution proceeds at 193 to cause the display of the symbol "CON→MOD" and the flashing of the arrowhead 42 to indicate transfer will proceed from the controller to the module when the switch 82 is actuated. Program execution then proceeds at 195 to determine whether the switch 82 is actuated, and when it is, at 196 to copy the contents of the controller buffer A-CN to the module buffer A-MM. Then, the controller is reset at 197 for normal operations without clearing the controller buffer A-CN, and program execution returned to the main program.

If it is determined at 198 that the function pointer is equal to one, the symbol "MOD→CON" is displayed at 199 with a flashing arrowhead 82 to indicate that transfer will proceed from the module to the controller when the switch 82 is actuated. When it is determined at 200 that the switch 82 is actuated, the contents of the module buffer A-MM are then copied at 201 to the controller buffer A-CN.

If the function pointer is neither zero or one (when it is two), the symbol "FLD→CON" is displayed at 202 with a flashing arrowhead 82 to indicate that transfer will proceed from the other buffer of the module to the controller when the switch 82 is actuated. When it is determined at 203 that the switch 82 is actuated, the contents of the module buffer B-MM are copied at 204 to the controller buffer A-CN.

Thus, the memory transfer subroutine greatly facilitates controller programming. It combines with the other novel features described to provide an irrigation controller that overcomes many problems of the prior art. It is a microprocessor-based controller that includes a portable memory module for remote programming purposes, together with provisions for automatic adjustment of watering intervals, open circuit testing, and individual station shutdown in case of malfunctioning. It can compensate for varying degrees of soil dampness. It can test for open circuit conditions, and it permits individual station shutdown for fault conditions, such as a high pressure condition.

Although an exemplary embodiment of the invention has been shown and described, many changes, modifications, and substitutions may be made by one having ordinary skill in the art without necessarily departing from the spirit and scope of this invention.

What is claimed is:

1. An irrigation controller, comprising:
   microprocessor means for controlling a plurality of watering stations under program control according to a plurality of parameter values;
   a module dimensioned and arranged to enable to user to transport the module by hand;
   said module including module memory means for storing a set of the parameter values;
   connector means, including mating first and second connectors operationally connected to respective ones of the microprocessor means and the module memory means, for enabling the user to removably couple the module memory means to the microprocessor means in order to enable transfer of the set of the parameter values between the microprocessor means and the module memory means;
   means for transferring the set of parameter values from the module memory means to the microprocessor means; and
   means for transferring information from the microprocessor means to the module memory means.

2. A controller as recited in claim 1, wherein the means for transferring the set of parameter values includes:
   means for reading and verifying a code word stored in the module memory means before initiating a transfer of the set of parameter values.

3. A controller as recited in claim 1, wherein the means for transferring the set of parameter values includes:
   means for prompting a user to actuate a control panel switch on the controller in order to initiate a transfer.

4. A controller as recited in claim 1, wherein the means for transferring the set of parameter values includes:
   means for enabling a user to initiate transfer of the set of parameter values from a user-selected one of a pair of first and second buffers in the module memory means to the microprocessor means.

5. A controller as recited in claim 1, wherein the means for transferring the set of parameter values includes:
means for communicating to a user that a transfer of the set of parameter values has been completed.

6. An irrigation controller, comprising:
a housing;
microprocessor means mounted on the housing for controlling a plurality of watering stations under program control according to a plurality of parameter values;
a module dimensioned and arranged to enable a user to transport the module by hand;
said module including module memory means for storing a set of the parameter values;
connector means, including mating first and second connectors mounted on respective ones of the housing and the module and operationally connected to respective ones of the microprocessor means and the module memory means, for enabling the user to removably couple the module memory means to the microprocessor means in order to enable transfer of the set of the parameter values between the microprocessor means and the module memory means;
means for transferring the set of parameter values from the module memory means to the microprocessor means; and
means for transferring information from the microprocessor means to the module memory means.

7. A controller as recited in claim 6, wherein:
the module memory means is battery powered.

8. An irrigation controller, comprising:
microprocessor means for activating each one of a plurality of watering stations under program control so that each one of the watering stations is activated for an assigned period of time indicated by a respective one of a plurality of stored parameter values; and
first input means for coupling a first input signal to the microprocessor means while a first one of the watering stations is activated to indicate when the first watering station has been activated a desired length of time;
the microprocessor means including means for adjusting the period of time that each one of the watering stations is activated according to the ratio of the desired length of time to the assigned period of time for the first watering station.

9. An irrigation controller as recited in claim 8, wherein the means for adjusting includes:
means for timing the amount of the assigned period of time for the first one of the watering stations that occurs before the occurrence of the first input signal;
means for computing the ratio of the amount of the assigned period of time that occurs to the total amount of the assigned period of time; and
means for adjusting the period of time that each one of the watering stations is activated accordingly.

10. A controller as defined in claim 1 wherein the module includes an energy source for the module memory means.

11. An irrigation controller, comprising:
microprocessor means for activating a plurality of watering stations under program control so that each of the watering stations is activated for an assigned period of time indicated by a respective one of a plurality of stored parameter values;
first input means for coupling a first input signal to the microprocessor means while a first of the watering stations is activated to indicate when the first watering station has been activated a desired length of time; and
the microprocessor means including means responsive to said desired length of time for the first watering station for adjusting the period of time that a second of the watering stations is activated.

12. A controller as defined in claim 11 wherein said first means includes means for sensing the dampness of soil watered by the first watering station.

13. An irrigation controller for controlling a plurality of electrically operated watering stations comprising:
microprocessor means for activating the electrically operated watering stations under program control;
the microprocessor including open circuit testing means for determining whether an open electrical circuit condition exists in association with one of the watering stations; and
said open circuit testing means checking said watering stations in sequence to determine if said open electrical circuit condition exists.

14. A controller as recited in claim 13, wherein the open circuit testing means includes:
means for producing a first fault signal when it is determined that an open circuit condition exists.

15. A controller as recited in claim 14, wherein the open circuit testing means includes:
means for identifying which one of the watering stations is associated with an open circuit condition.

16. A controller as recited in claim 13, wherein the open circuit testing means includes:
means for causing the display of an image to indicate the occurrence of an open circuit condition.

17. A controller as defined in claim 13 including means for preventing initiation of the operation of the open circuit testing means until all the watering stations are off.

18. A controller as defined in claim 13 including means for periodically initiating operation of the open circuit testing means.

19. A method of programming an irrigation controller of the type which includes a microprocessor, for controlling a plurality of watering stations under program control according to a plurality of parameter values; said method comprising:
programming a portable module with a set of the parameter values at a first location;
transporting the programmed module from the first location to the irrigation controller;
coupling the module to the irrigation controller to allow transfer of the set of the parameter values from the module to the microprocessor of the irrigation controller;
transferring the set of parameter values from the module to the microprocessor of the irrigation controller; and
transferring information from the microprocessor to the module.

* * * * *